US008646797B2

(12) United States Patent
Buckley

(10) Patent No.: US 8,646,797 B2
(45) Date of Patent: *Feb. 11, 2014

(54) REAR SUSPENSION SYSTEM FOR BICYCLES

(76) Inventor: Noel Buckley, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,238

(22) Filed: Jun. 10, 2011

(65) Prior Publication Data

US 2011/0233893 A1    Sep. 29, 2011

Related U.S. Application Data

(60) Division of application No. 12/046,303, filed on Mar. 11, 2008, now Pat. No. 7,980,579, which is a continuation of application No. 11/008,260, filed on Dec. 10, 2004, now Pat. No. 7,467,803.

(60) Provisional application No. 60/528,725, filed on Dec. 12, 2003.

(51) Int. Cl.
*B62K 3/02* (2006.01)

(52) U.S. Cl.
USPC ............ 280/284; 280/283; 280/285; 280/288

(58) Field of Classification Search
USPC .................................. 280/284, 283, 285, 288
See application file for complete search history.

(56) References Cited

U.S. PATENT DOCUMENTS

| 4,789,174 A | 12/1988 | Lawwill |
| 5,121,937 A | 6/1992 | Lawwill |
| 5,217,241 A | 6/1993 | Girvin |
| 5,244,224 A | 9/1993 | Busby |
| 5,306,036 A | 4/1994 | Busby |
| 5,409,249 A | 4/1995 | Busby |
| 5,441,292 A | 8/1995 | Busby |
| 5,474,318 A | 12/1995 | Castellano |
| 5,509,679 A | 4/1996 | Leitner |
| 5,553,881 A | 9/1996 | Klassen et al. |
| 5,628,524 A | 5/1997 | Klassen et al. |
| 5,671,936 A | 9/1997 | Turner |
| 5,678,837 A | 10/1997 | Leitner |
| 5,899,480 A | 5/1999 | Leitner |
| 5,957,473 A | 9/1999 | Lawwill |
| 6,086,080 A | 7/2000 | Scheffer |

(Continued)

OTHER PUBLICATIONS

Jamis Bikes Webpage, 2003 Jamis Dakar XLT (2 pages).

(Continued)

*Primary Examiner* — Tashiana Adams
*Assistant Examiner* — Marlon Arce
(74) *Attorney, Agent, or Firm* — Holland & Hart LLP

(57) ABSTRACT

A rear suspension system for bicycles, such as freeride, downhill and trail-style mountain bikes. The suspension system includes a rear suspension for coupling the rear wheel of the bicycle to the bicycle frame, a rear shock absorber disposed entirely in front of the seat tube of the frame and a linkage for operatively coupling the rear suspension to the rear shock absorber. The linkage intersects the longitudinal axis of the seat tube for transmitting rear suspension forces around the seat tube to the rear shock absorber. The seat tube is preferably continuous and is disposed so that the bicycle seat is adjustable over a full range of seat positions. Additionally, the seat tube and rear suspension system are configured so that the rear wheel and rear suspension will not contact the seat tube, seat, or bicycle rider even when the rear suspension system is in a fully compressed, forward position.

26 Claims, 7 Drawing Sheets

(56) References Cited

U.S. PATENT DOCUMENTS

| | | | |
|---|---|---|---|
| 6,206,397 | B1 | 3/2001 | Klassen et al. |
| 6,378,885 | B1 | 4/2002 | Ellsworth et al. |
| 6,471,230 | B2 | 10/2002 | Ellsworth et al. |
| 6,595,538 | B2 | 7/2003 | Ellsworth et al. |
| 6,843,494 | B2 | 1/2005 | Lam |
| 7,048,292 | B2 | 5/2006 | Weagle |
| 7,581,743 | B2 | 9/2009 | Graney |
| 2004/0061305 | A1 | 4/2004 | Christini |
| 2005/0057018 | A1 | 3/2005 | Saiki |
| 2005/0067810 | A1 | 3/2005 | Weagle |
| 2005/0253357 | A1 | 11/2005 | Chang et al. |

OTHER PUBLICATIONS www.titusti.com/suspension.html (available at least as early at Jul. 12, 2005) (5 pages).

www.dw-link.com (available at least as early at Jul. 12, 2005) (1 page).

www.giantbicycles.com/global/en-US/maestro_intro/maestro_technologyy/html.aspx (available at least as early at Jul. 12, 2005) (2 pages).

www.specialized.com/bc/techlab_fsr.jsp?a=b (flash) (available at least as early at Jul. 12, 2005) (1 page).

www.santacruzmtb.com/vpp. (available at least as early at Jul. 12, 2005) (2 pages).

www.ellsworthbikes.com/bikes/comparison/index.cfm (available at least as early at Jul. 12, 2005) (2 pages).

REAR SUSPENSION SYSTEM FOR BICYCLES

CROSS REFERENCE TO RELATED APPLICATIONS

This application is a divisional of application Ser. No. 12/046,303, filed Mar. 11, 2008, now U.S. Pat. No. 7,980,579, issued Jul. 19, 2011, which is a continuation of application Ser. No. 11/008,260, filed Dec. 10, 2004, now U.S. Pat. No. 7,467,803, issued Dec. 23, 2008, which claims the benefit of the filing date of U.S. Provisional Application No. 60/528,725, filed Dec. 12, 2003. The disclosure of each of the previously referenced U.S. patent applications and patents (if applicable) is hereby incorporated by reference in its entirety.

TECHNICAL FIELD

This application relates to an improved rear suspension system for bicycles.

BACKGROUND

High-end mountain bikes typically have both rear and front suspension systems to assist in traversing uneven terrain. This is particularly the case for freeride, downhill and trail bikes which are designed to descend steep and uneven mountain terrain, often at high speeds. Many rear suspension systems designed for freeriding and other biking applications are known in the prior art. Such systems generally include a rear suspension permitting a limited degree of travel of the rear wheel relative to the bicycle frame and a rear shock absorber for absorbing suspension forces. The range of rear wheel travel that is permitted by existing suspension systems varies, but is typically within the range of about 5 to 12 inches measured vertically (although some designs permit travel outside this range).

While many mid and long rear wheel travel bicycle designs are known, most designs have rear suspension systems which compromise overall bike performance and versatility. Two primary problems caused by existing designs are (a) undesirable contact between the rear tire or suspension linkages and the bicycle seat or seat tube when the rear suspension system is under full compression; and (b) a restricted range of adjustability of the seat position.

U.S. Pat. Nos. 5,509,679, 5,678,837 and 5,899,480 owned by Specialized Bicycle Components, Inc. of Morgan Hill, Calif. describe two primary types of four bar linkage rear suspension systems, commonly referred to as the walking beam and low linkage designs. The above-noted patents are incorporated herein by reference in their entireties. The walking beam design is illustrated in FIG. 1 and includes a rocker arm link extending in a near horizontal orientation and a rear shock absorber having a travel axis extending in a near vertical orientation. The rocker arm link pivots on the seat tube portion of the bicycle frame and extends between an upper end of the rear shock absorber and an upper end of the seat stays. The main manufacturing advantages of the walking beam design are that the frame of the bike can be built out of a typical "triangle" shape, common in the bicycle industry, the pivot point for the rocker arm link can be conveniently arranged to mount to the seat tube, and the rear shock can be conveniently pivotally connected to the top of the bottom bracket area. The main performance advantage of the walking beam design is that the seat tube is straight and continuous and allows for a full adjustment range of the seat (i.e., saddle) height. This is important because the seat needs to be raised to the correct biomechanical position to allow for effective pedaling performance when climbing up hills and crossing non-technical terrain and the seat needs to be lowered substantially (typically by 4 to 8 inches or more depending upon the rider's height and body proportions) so that the rider can safely and effectively traverse difficult or challenging terrain and obstacles.

The walking beam design is suitable for bicycle suspension frames with up to approximately 6 inches of vertical rear wheel travel. However, as the rear travel gets longer than about 6 inches, several problems arise with the walking beam design. As the rear wheel travel path starts to come forwards, towards the front of the bike, this movement combined with the generally rearward sloping seat tube causes the rear wheel and the seat tube to collide before the rear wheel has finished its travel. Further, the relatively high linkage arrangement (when compared to the low linkage four bar design described below) causes the rocker arm link (when the rear suspension is under substantial or full compression) to interfere with the low rearward position of the rider's "bottom" (a position needed to ride challenging terrain) and also the rear seat when the seat is lowered.

Longer travel suspension frames work better with rear shock absorber stroke length ratios that match their travel. If the ratio of rear wheel travel versus shock stroke length increases beyond a favourable ratio, then the relatively short stroke shock absorber will be less effective in its ability to control the movement of the rear suspension and will be potentially more prone to failure. Additionally, higher rear shock absorber spring rates are required, which reduces the "suppleness" of the rear suspension's feel. As the rear wheel's travel increases, the rocker arm link pivot must also be moved up "higher" along the seat tube, to accommodate the longer stroke rear shock absorber (which is fixed near the bottom bracket of the front triangular frame as shown in FIG. 1). Additionally, the rocker arm link needs to be longer to accommodate the greater length of the shock absorber stroke. This exacerbates the problems discussed above concerning the interference of the rear wheel and rocker arm link with the frame's seat tube, seat, and the rider's bottom. These effects are increased even more in the case of smaller frame sizes designed for smaller riders, because there is less room for the suspension elements to move due to a seat that is in an overall lower position (because the rider is smaller).

Low linkage four bar rear suspensions as exemplified by the Specialized FSR design shown in FIG. 2 also exhibit several limitations. On the one hand, such low linkage designs do not suffer from rear wheel and rocker arm link interference issues as described above in connection with the walking beam configuration. This is because the rocker arm link is typically mounted in a lower, diagonal to near vertical position, and the rear shock absorber is mounted in a diagonal to near horizontal position (FIG. 2). Additionally, the seat tube position can be arbitrary, as it is typically mounted to the end of a cantilevered "beam", instead of being welded in line with the bottom bracket axis. However, on the other hand the low linkage design requires that the rear shock "interrupt" the seat tube and hence causes the seat tube to be cut off at the shock absorber location. This severely limits the range of seat and seat post adjustability. This is a major problem on bikes designed for technical riding where the seat needs to be substantially lowered so that it is out of the way of the rider's body movement, such as when traversing uneven downhill terrain. To get the seat low enough, technical riders typically cut their seat post to a shorter length. However, this leaves the seat post too short and the seat cannot be raised enough to provide a biomechanically correct pedaling position for the rider, particularly when climbing hills. A full range of adjustable seat post positions is desirable for the reasons specified above.

Other existing rear suspension systems designed for technical riding, such as single pivot swing arm and virtual pivot point designs, also suffer from various drawbacks. For example, rear suspensions having long swing arms typically have lower overall lateral rigidity than other designs. Some long travel virtual pivot point designs include interrupted seat tubes, or have full length seat tubes which are bent to provide sufficient rear wheel clearance, but such designs restrict the range of seat height adjust-ability. Other four bar virtual pivot point designs have elongated seat stays which extend past the seat tube to allow for a full length seat tube. However, increasing the length of the seat stays also sacrifices the overall lateral stability of the rear suspension system which is not desirable.

The need has therefore arisen for an improved rear suspension system for bicycles which maintains the advantages of prior art designs while eliminating or substantially reducing their disadvantages.

SUMMARY

In accordance with the invention, a rear suspension system for a bicycle having a rear wheel and a frame is provided. The frame includes a seat tube having a longitudinal axis. The system includes a rear suspension pivotally coupling the wheel to the frame; a rear shock absorber disposed entirely forwardly of the seat tube; and a linkage coupling the rear suspension to the shock absorber for transferring forces therebetween, wherein the linkage extends in an orientation intersecting a plane passing through the seat tube parallel to the longitudinal axis.

The linkage is configured to transmit the suspension forces around the seat tube. In one embodiment the linkage may straddle the seat tube. For example, the linkage may comprise first and second linkage elements disposed on opposite sides of the seat tube. The linkage preferably has a length exceeding the diameter of the seat tube and is pivotally coupled to both the rear suspension and the shock absorber. In one embodiment the rear suspension may include one or more pivot points, where the most forward one of the pivot points is located rearwardly of the longitudinal axis.

Preferably the seat tube of the bicycle frame is continuous and the shock absorber has first and second ends coupled to the frame forwardly of the seat tube. In one embodiment the first end of the shock absorber is pivotally coupled to the frame and the second end of the shock absorber is pivotally coupled to the linkage. In one particular configuration, the frame comprises a top tube, a head tube and a down tube in addition to the seat tube, and the first and second ends of the shock absorber are coupled to the down tube.

In one embodiment, the bicycle frame is orientable in a vertical plane and the shock absorber may be supported so that its longitudinal axis extends in a plane at an angle of between about 45-90° relative to the vertical plane. In one embodiment the shock absorber may extend in a horizontal or near-horizontal orientation to maximize its stroke length. In a particular embodiment the shock absorber may extend beneath and parallel to a top tube of the bicycle frame.

In one particular embodiment, the rear suspension may comprise a four bar suspension design including a chain stay link and a seat stay link coupled to the rear wheel and a rocker arm link coupled to the seat stay link and extending forwardly therefrom. In one embodiment the linkage is coupled to the rocker arm. In alternative embodiments the linkage is alternatively coupled to the seat stay link or the chain stay link.

The suspension system is particularly useful to mid to long rear wheel travel bicycle designs where the range of vertical travel of the suspension system exceeds approximately 5 inches.

The application also relates to a bicycle having a rear wheel and a frame orientable in a vertical plane, the frame comprising a seat tube having a longitudinal axis. The bicycle further includes a rear suspension for pivotally coupling the rear wheel to the frame, wherein the rear wheel is movable within a range of travel between a most rearward position and a most forward position. The bicycle further includes a rear shock absorber disposed entirely forwardly of the seat tube and a linkage coupling the rear suspension to the rear shock absorber, wherein the linkage extends in an orientation intersecting a plane passing through the seat tube parallel to the longitudinal axis.

Preferably the rear wheel and the rear suspension system are spaced apart from the seat tube in the most forward position and the longitudinal axis of the seat tube extends at an angle substantially tangential to the most forward position of the rear wheel. In one embodiment the longitudinal axis of the seat tube extends at an angle between about 50-75° degrees relative to a horizontal plane passing through the seat tube and extending perpendicular to the vertical plane. More preferably, the longitudinal axis of the seat tube extends at an angle of between about 55-65° degrees relative to the aforesaid horizontal plane.

The seat tube of the frame is preferably continuous. The frame may also include a down tube and a bottom bracket mounted at a lower end of said down tube for receiving a crank assembly of the bicycle. The bottom end of the seat tube is offset forwardly as compared to conventional frame designs such that the longitudinal axis of said seat tube intersects the down tube at a location forward of the bottom bracket.

The invention may also relate to a kit for coupling a rear suspension to a shock absorber using the linkage of the applicant's invention.

BRIEF DESCRIPTION OF THE DRAWINGS

In drawings which illustrate embodiments of the invention, but which should not be construed as restricting the spirit or scope of the invention in any way.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 3:
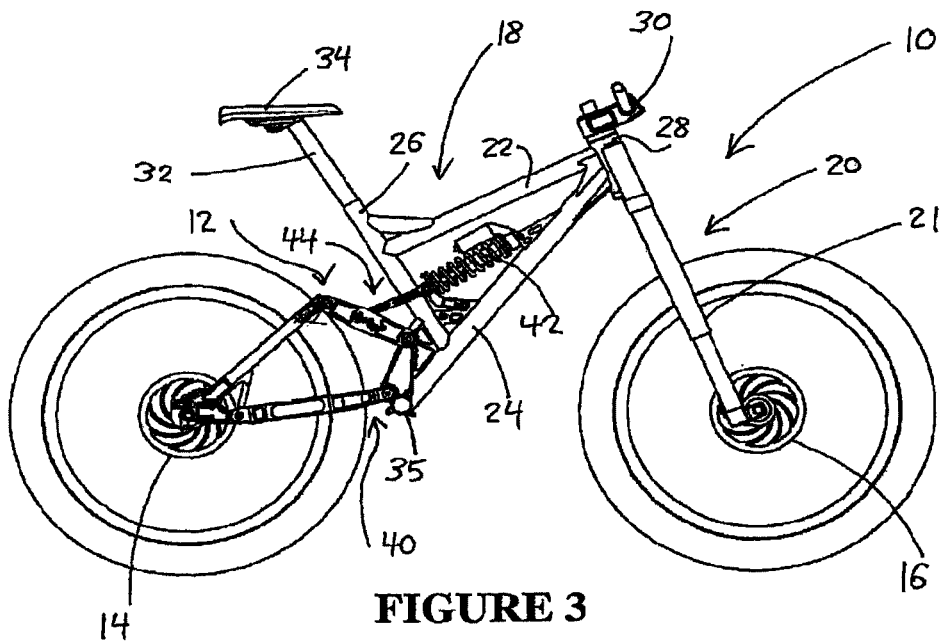
FIG. 3 is a side elevational view of a bicycle having the rear suspension system of the invention.

This application relates to a bicycle 10 having an improved rear suspension system 12 (FIG. 3). Bicycle 10 includes a rear wheel 14, a front wheel 16 and a frame 18 coupled to wheels 14, 16 for supporting a rider. As described in detail below, rear suspension system 12 pivotably couples rear wheel 14 to frame 18. Front wheel 16 is coupled to frame 18 by means of front forks 20. Forks 20 may optionally include front shock absorbers 21.

As used in this patent application, the terms "front", "forward", and "forwardly" mean toward the front end of bicycle 10 and the terms "rear, "rearward", and rearwardly mean toward the rear end of bicycle 10. Similarly, the words "top", "upper", "upward" and "upwardly" mean toward the upper portion of bicycle 10 when it is in an ordinary riding orientation with wheels 14, 16 resting on a support surface, as shown in FIG. 3. The words "bottom", "lower", "loward" and "lowardly" refer to the lower portion of bicycle 10 when it is in the ordinary riding orientation.

Figure 2:
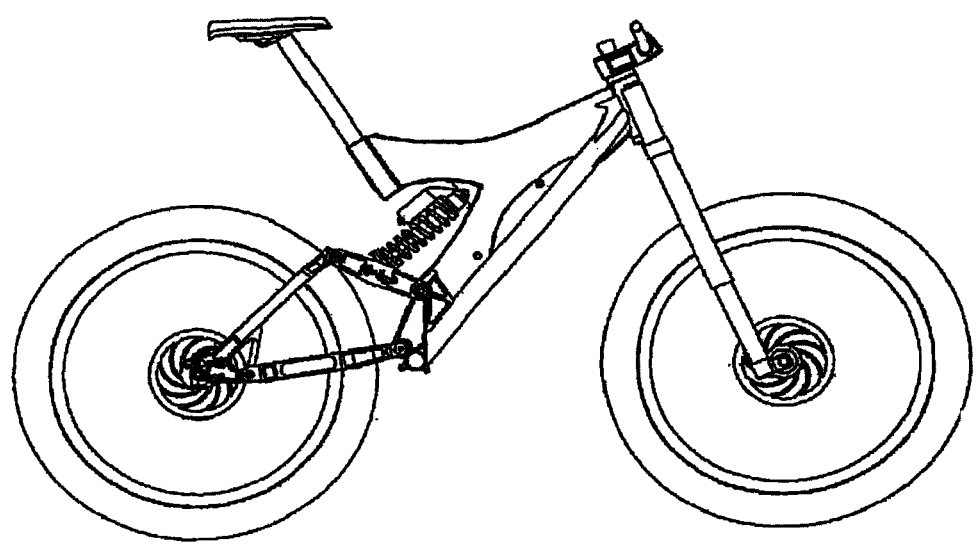
FIG. 2 is a side elevational view of a rear suspension system of the prior art configured in a low linkage four bar subassembly.

In the illustrated embodiment, bicycle frame 18 has a generally triangular configuration and comprises a top tube 22, a down tube 24 and a seat tube 26. Frame 18 also includes a head tube 28 for receiving forks 20 and handlebars 30 at the front end of bicycle 10. A seat post 32 supporting a seat 34 is slidably coupled to seat tube 26. The position of seat post 32 is adjustable to alter the height of seat 34. Although the present invention is described with reference to the triangular-shaped frame 18 of FIG. 3, the invention is equally applicable to other frame designs, including monocoque frames (such as is shown in FIG. 2).

Figure 1:
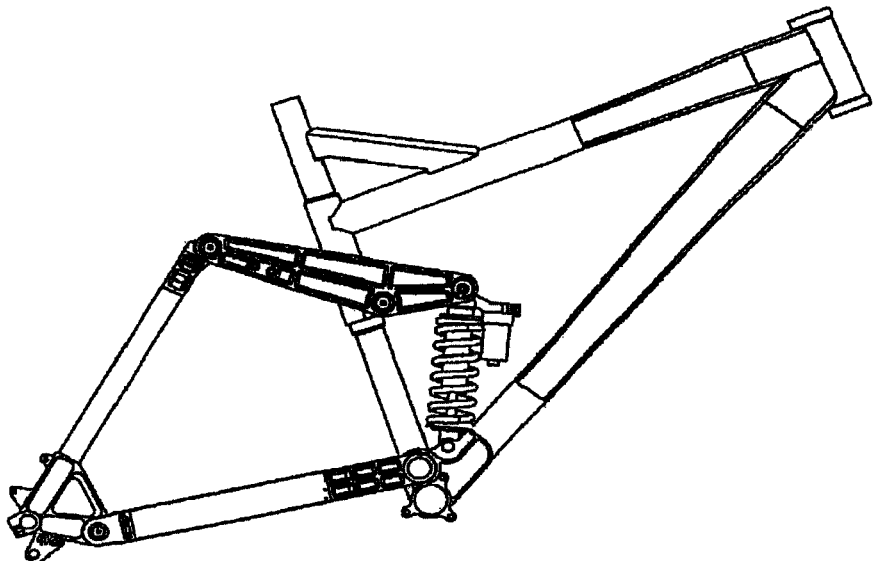
FIG. 1 is a side elevational view of a rear suspension system of the prior art configured in a walking beam four bar subassembly.

Bicycle frame 18 further includes a bottom bracket 35 located at the bottom end of down tube 24 for receiving a pedal assembly (not shown) including a crank arm and bottom bracket axle. Most conventional bicycle frames having a triangular configuration have a seat tube which is coincident with the bottom bracket as shown in FIG. 1 (i.e., the longitudinal axis of the seat tube intersects the bottom bracket). However, in the Applicant's invention, the position of seat tube 26 is shifted forwardly so that the axis of seat tube 26 intersects down tube 24 at a location spaced forwardly and upwardly from bottom bracket 35. This feature is described in further detail below. The Applicant's frame 18 may further include a bottom bracket block 37 for supporting bottom bracket 35 and elements of rear suspension system 12 at a location rearwardly of seat tube 26.

Figure 4:
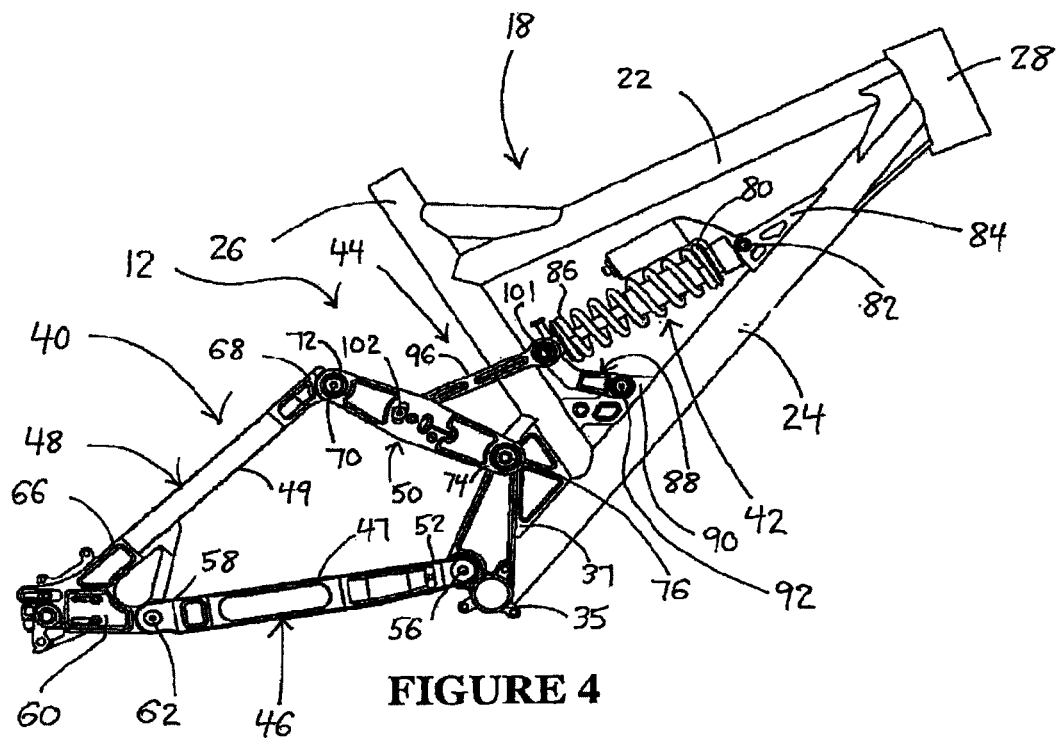
FIG. 4 is an enlarged side elevational view of the applicant's rear suspension system of FIG. 3.

Rear suspension system 12 is illustrated in detail in FIGS. 4 and 5. System 12 may include a rear suspension 40, a rear shock absorber 42 and a linkage 44 for coupling rear suspension 40 to shock absorber 42. Linkage 44 enables transfer of forces around seat tube 26 between suspension 40 and shock absorber 42 as discussed in detail below.

Figure 5A:
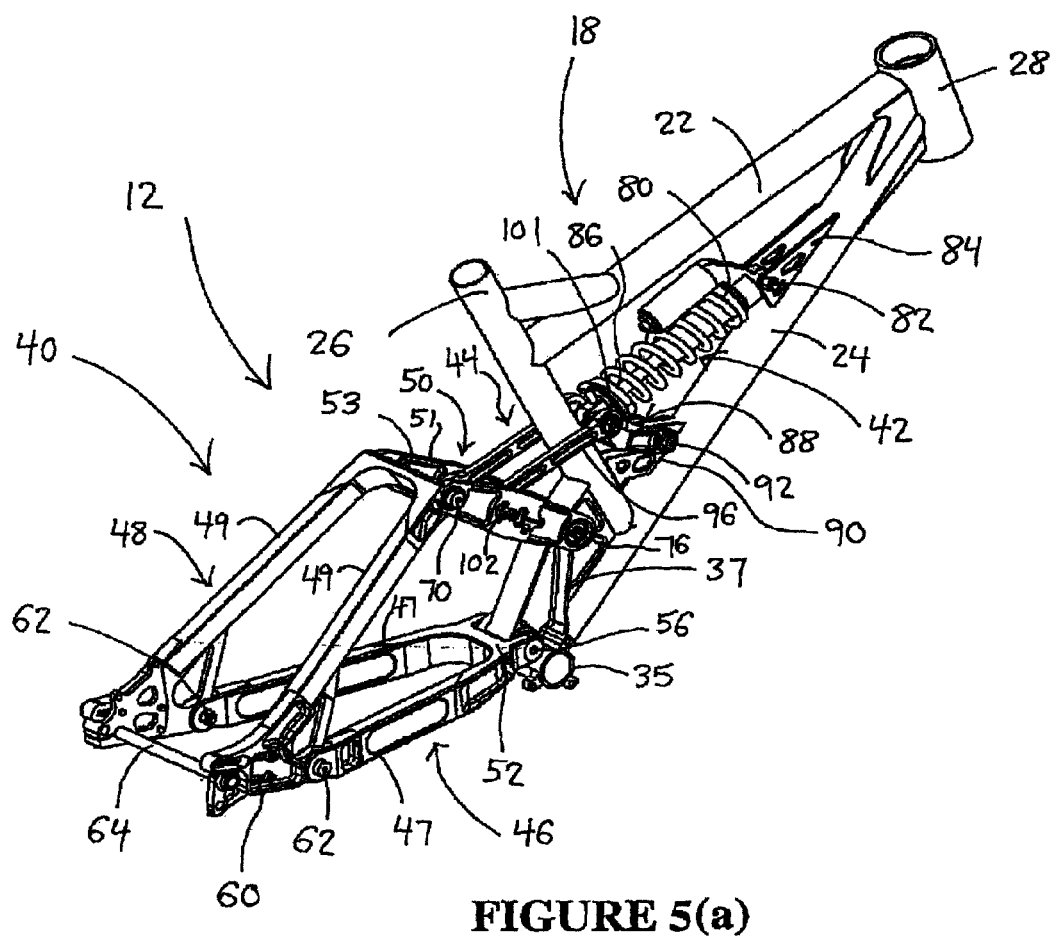
FIG. 5(a) is an enlarged rear isometric view of the applicant's rear suspension system of FIG. 3 in an uncompressed configuration.
Figure 5B:
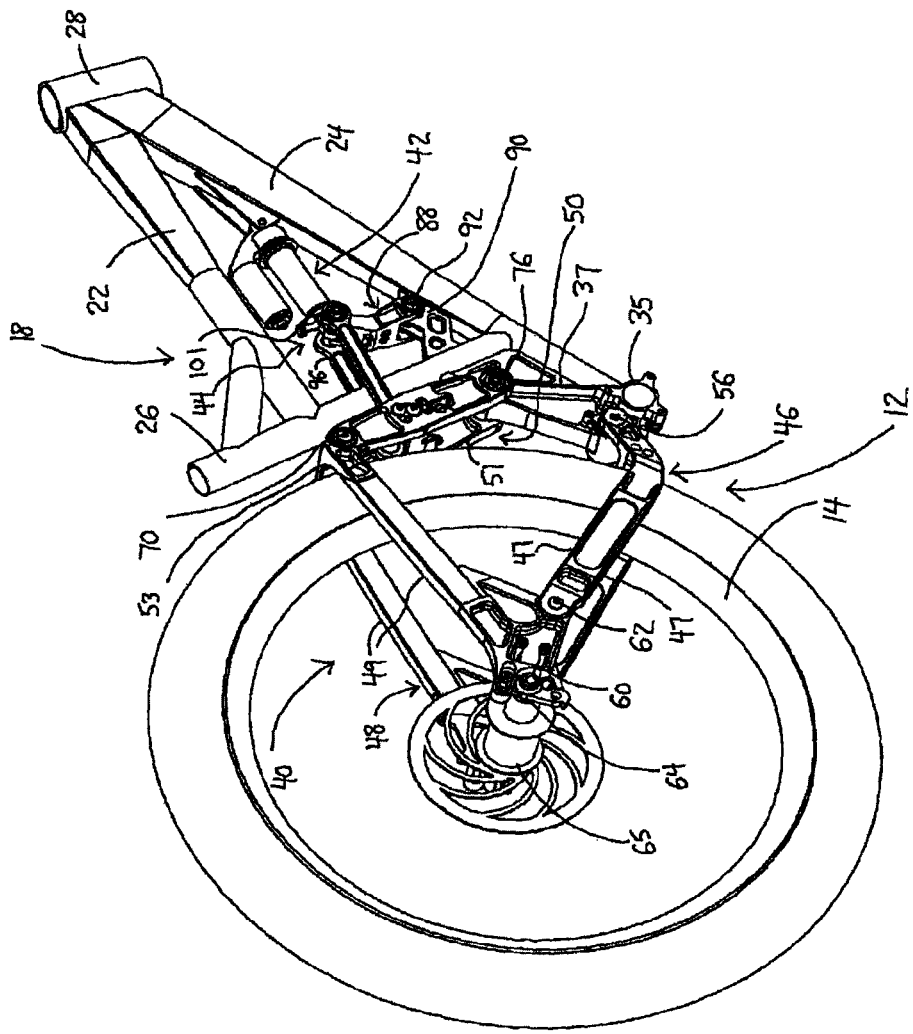
FIG. 5(b) is an enlarged isometric view of the applicant's rear suspension system of FIG. 3 under full compression.

In the illustrated embodiment, rear suspension 40 is configured in a conventional low linkage four bar arrangement. Such an arrangement is described in detail in U.S. Pat. Nos. 5,509,679, 5,678,837 and 5,899,480 which are incorporated herein by reference, as indicated above. In this arrangement, rear suspension 40 includes a chain stay link 46, a seat stay link 48 and a rocker arm link 50 which, together with frame 18, define a four bar linkage. More particularly, chain stay link 46 includes spaced-apart first and second arms 47 which straddle rear wheel 14 when bicycle 10 is assembled (FIG. 3). A yolk-shaped first end 52 of chain stay arms 47 is pivotably coupled to bottom bracket block 37 of frame 18 by means of a pivot 56. A second end 58 of each chain stay arm 47 is pivotably coupled to a drop-out bracket 60 by means of a pivot 62. Drop-out bracket 60 supports axle 64 and hub 65 of rear wheel 14 (FIGS. 5(a) and 5(b)). In the embodiment of FIG. 3-5 pivot 62 is therefore spaced a short distance forwardly of the axis of axle 64 and hence the center of rear wheel 14 (in the schematic views of FIGS. 6-10 reference 64 denotes the center of wheel 14).

Seat stay link 48 includes spaced-apart arms 49 which also straddle rear wheel 14 when bicycle 10 is assembled. A first end 66 of each seat stay arm 49 is coupled to a corresponding drop-out bracket 60 and a second end 68 of each seat stay arm 49 is coupled to rocker arm link 50 by means of a pivot 70. In the illustrated embodiment rocker arm link 50 includes spaced-apart arm elements 51 which are connected together at a first end 72 thereof by a seat stay arch 53. Seat stay arch 53 extends transversely between arm elements 51 in the vicinity of pivots 70. Each rocker element 51 also has a second end 74 pivotably coupled to bottom block 37 of frame 18 by means of a pivot 76. As shown best in FIGS. 5(a) and 5(b), pivot 76 is located proximate seat tube 26 and above a pivot 56.

Rear suspension 40 illustrated in FIGS. 3-5 thus includes four separate pivot points, namely pivots 56, 62, 70 and 76. This arrangement enables rear wheel 14 to pivot relative to bicycle frame 18 between a rear position (FIG. 5(a)) when traveling over flat terrain and a raised forward position (FIG. 5(b)) to accommodate uneven terrain. The maximum amount of travel of rear wheel 14 permitted by rear suspension 40 may vary, but is typically in the range of 5-10 inches measured vertically. Unlike conventional single pivot suspension designs, rear suspension 40 has multiple pivot points and is therefore not constrained to follow a constant arc pivoting wheel path. Rather, as will be appreciated by a person skilled in the art, suspension 40 exhibits the advantages of other known four bar suspension geometries in terms of pedal-induced suspension movement, acceleration, pedal feedback and braking characteristics.

As will also be appreciated by a person skilled in the art, the drawings illustrate only one example of a rear suspension 40, namely a low linkage four bar configuration, and many other types of suspension systems could be substituted without departing from the invention, including walking beam four bar linkages, virtual pivot point designs and single pivot swing arm designs.

As indicated above, rear suspension system 12 also includes a rear shock absorber 42 for absorbing forces received from rear suspension 40 via linkage 44. In the Applicant's invention shock absorber 42 is positioned entirely forwardly of seat tube 26. In the illustrated embodiment, shock absorber 42 extends along an axis substantially parallel to top tube 22. This orientation is sometimes referred to in the bicycle industry as a "horizontal" orientation as opposed to a "vertical" orientation as exemplified by the walking beam design shown in FIG. 1. However, neither orientation is precisely "horizontal" or "vertical" and many variations are possible. One advantage of orientating shock absorber 42 parallel to top tube 22 is that the length of shock absorber 42 may be maximized (i.e., there is sufficient available space to accommodate relatively large, long stroke length shock absorbers 42). There are also advantages to isolating shock absorber 42 from the effects of side loading of rear suspension 40 and protecting shock absorber 42 from "tire roost" (i.e., protecting shock absorber 40 from being exposed to soil and water flung upward by the bicycle tires).

In the illustrated embodiment a first end 80 of shock absorber 42 is coupled by means of a pivot 82 to a first support bracket 84 mounted on an upper, forward portion of frame down tube 24. A second end 86 of shock absorber 42 is coupled by means of a pivoting swing link 88 to a second support bracket 90 mounted on an upper lower portion of frame down tube 24. More particularly, pivoting swing link 88 has one end coupled to second support bracket 90 by means of a pivot 92 and another end coupled to second end 86 of shock absorber 42.

Linkage 44 couples rear suspension 40 to shock absorber 42. In the embodiment illustrated in FIGS. 3-5, linkage 44 couples second end 86 of shock absorber 42 to a central portion of rocker arm 50. However, many other arrangements for operatively coupling rear suspension 40 and shock absorber 42 may be envisioned, as described below. In the embodiment of FIGS. 3-5, linkage 44 includes a pair of spaced-apart push linkages 96 which straddle seat tube 26. A first end of 98 of each push linkage 96 is pivotably connected to second end 86 of shock absorber 42 by means of a pivot 101 and a second end 100 of each push linkage 96 is pivotably connected to a midportion of a corresponding rocker arm element 51 by means of a pivot 102. In operation, forward pivoting motion of rocker arm 50 toward seat tube 26 causes a transfer of forces through push linkages 96 to shock absorber 42 (FIG. 5(*b*)). Thus linkage 44 transfers suspension forces received by rear suspension 40 at a location rearward of seat tube 26 to shock absorber 42 located forward of seat tube 26. In order to accomplish this function linkage 44 extends in a plane intersecting the longitudinal axis of seat tube 26.

In an alternative embodiment of the invention linkage 44 may include a single push linkage 96 (i.e., it is not a requirement of the invention that two separate push linkages 96 straddle seat tube 26).

Linkage 44 is sometimes referred to herein as FourX4™ or 4×4™ linkage. This is because each push linkage 96 includes four separate pivots to transfer forces from rear suspension 40 around seat tube 26 to shock absorber 42, namely pivots 76, 92, 101 and 102. As described above, rear suspension 40 also employs four different pivot points, namely pivots 56, 62, 70 and 76. Thus rear suspension system 12 may be considered do be a "dual four bar" suspension system. As a result of the relative positions and spacing of the aforesaid pivots, the special relationship between the various linkages of rear suspension system 12 changes significantly between the uncompressed riding configuration of FIG. 5(*a*) and the compressed configuration of FIG. 5(*b*). For example, as rocker arm link 50 moves forwardly to a more upright orientation extending generally parallel to seat tube 26 as shown in FIG. 5(*b*), swing link 88 is also caused, via push linkages 96, to pivot to a more upright orientation, thereby causing compression of shock absorber 42.

One notable difference between the present invention and some prior art configurations is that in the applicant's design the most forward pivot point of rear suspension 40 is located rearward of the longitudinal axis of seat tube 26 rather than on or in front of seat tube 26. One advantage of this design is that the length of chain stay link 46, seat stay link 48 and rocker arm link 50 can be maintained at a normal length (i.e., the length of one or more of such linkages does not need to be increased in order to connect directly to shock absorber 42 or to support structures located forwardly of seat tube 26). By contrast, some prior art designs have comparatively long linkages of swing arms which results in a sacrifice of lateral rigidity.

One other important advantage of the present invention is that a continuous seat tube 26 may be employed. This ensures that seat post has a sufficient height adjustment range. As used in this patent application a "continuous" seat tube 26 refers to a seat tube that extends upwardly from a lower portion of frame 18, such as down tube 24, and is straight and uninterrupted between frame 18 and its upper end. By way of contrasting example, FIG. 2 shows an arrangement of the prior art where the seat tube is discontinuous (i.e., it is interrupted at its lower end to accommodate a rear shock absorber underneath the seat tube). As explained above, such an arrangement restricts the adjustability of the seat post slidable within the seat tube and hence the available range of seat positions. By way of another example, a seat tube having a lower portion which is bent to avoid contact with the rear suspension would also considered to be "interrupted" and not continuous since the bend in the tube would impede a full range of adjustment of the seat post slidable therein.

Figure 6:
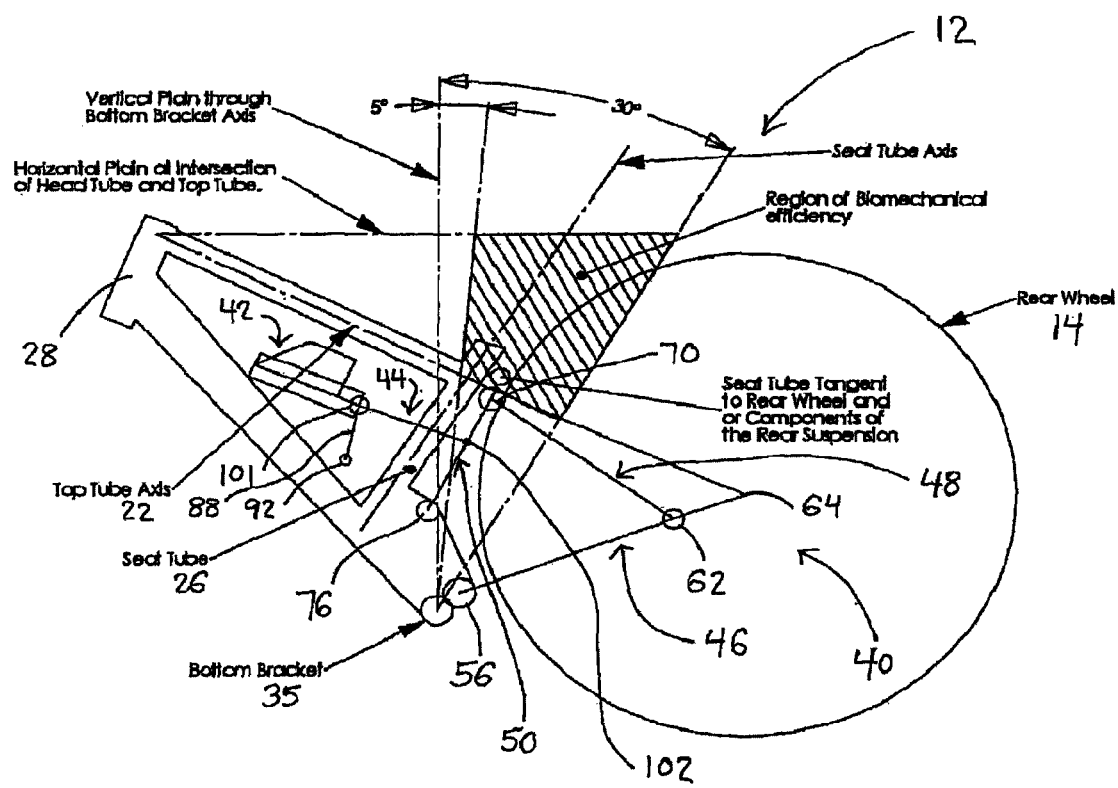
FIG. 6 is a schematic view showing the relative orientation of the bicycle subframe and rear suspension system of FIGS. 3-5 when the suspension system in a fully compressed configuration.

Further, as shown best in FIG. 6, in the applicant's invention the position and angle of continuous seat tube 26 has been engineered to ensure that a rider seated on seat 34 is in an optimum biomechancial position. In the following discussion seat tube 26 is assumed to extend in the same plane as the remainder of bicycle frame 18 (i.e., in a substantially vertical plane when bicycle 10 is in a normal riding orientation). The position and angle of seat tube 26 is determined by two primary constraints. First, seat tube 26 is positioned so that its longitudinal axis extends tangentially relative to the most forwardly intrusive position of rear wheel 14 and rear suspension 40 (FIGS. 5(*b*) and 6). As used herein "forwardly intrusive" refers to the most forward position of rear wheel 14 and/or rear suspension 40 when rear suspension system 12 is under full compression. In this case, rear wheel 14 is in a raised and forward position and seat stay link 48 and rocker arm link 50 are pivoted forwarded (FIG. 5(*b*)). For example, comparing FIGS. 5(*a*) and 5(*b*), seat stay arch 53 and pivots 70 have moved forwardly and upwardly to a position closely proximate to seat tube 26.

Secondly, the longitudinal axis of seat tube 26 is such that when seat 34 is raised or lowered to the desired height the rider is positioned in a biomechanically efficient position. As discussed above, seat 34 ordinarily needs to be raised to allow for effective pedaling performance when climbing hills and traversing non-technical terrain. Seat 34 also needs to be lowered substantially (usually by 4-8 inches or more depending on the rider's height and body proportions) so that the rider can safely and effectively traverse difficult or challenging terrain and obstacles, for example during aggressive freeriding. In particular, it is desirable to move seat 34 to a lower forward position so that it does not interfere with preferred downhill riding positions (when traversing steep downhill slopes or other challenging terrain, it is often desirable for the rider's "bottom" to be lowered and moved rearwardly to alter the rider's center of gravity).

As shown in FIG. 6, a "region of biomechanical efficiency" is shown in hatched lines which denotes a preferred range of positions of seat tube 26 (and hence seat 34). In this example, the bottom boundary of the region is the longitudinal axis of frame top tube 22; the front boundary of the region is a line that is 5° from a vertical plane passing through the axis of bottom bracket 35 and 850 from a horizontal plane centered on the bottom bracket axis; the rear boundary is of the region is a line that is 30° from a vertical plane passing through the axis of bottom bracket 35° and 60° from a horizontal plane centered on the bottom bracket axis; and the top boundary is a line formed by the intersection of the plane of the bicycle front frame and a horizontal plane which includes a point defined by the intersection of the longitudinal axes of top tube 22 and head tube 28.

As should be apparent from FIG. 6, it is important that the longitudinal axis of seat tube 26 extend within the region of biomechanical efficiency at a location that does not interfere with rear wheel 14 or rear suspension 40 when such components are in their most forward position (i.e., when rear shock absorber 42 is under full compression). As explained above, the position of seat 34 is largely determined by the angle of seat tube 26 (although seat 34 may be adjustable forwardly and rearwardly to a limited extent on rails (not shown) mounted on the top of seat post 32). Further, the actual position of seat 34 may be above the above-defined region of biomechanical efficiency, especially when seat 34 is in the most raised position for hill climbing, but the longitudinal axis of seat tube 26 preferably extends through this region. In the illustrated embodiment the longitudinal axis of seat tube 26 extends at an angle of about 58° relative to a horizontal plane (as defined above). Since the longitudinal axis of seat tube 26 is not coincident with the axis of bottom bracket 35, but is instead offset forwardly as described above, this corresponds to an effective seat tube angle of about 72° relative to the horizontal plane as measured from bottom bracket 35 (which support's the bicycle pedals). In one embodiment of the invention, the preferred actual angular range of seat tube 26 as measured above is between about 50-70° which corresponds to a preferred effective angular range of between about 60-85° as measured above. If the longitudinal axis of seat tube 26 is too sharply inclined (e.g., having an actual angle less than about 45° relative to a horizontal plane), this may result in rear suspension 40 contacting seat tube 26, seat post 32 or seat 34 when rear suspension 40 is in its most forwardly intrusive position, particularly in the case of long travel rear suspension systems. Further, such a sharply inclined seat tube 26 would restrict the amount of space available forward of seat tube 26 to accommodate rear shock absorber 42. Conversely, if the orientation is overly upright (e.g., if the longitudinal axis of seat tube 26 extends at an actual angle more than about 75° degrees relative to a horizontal plane), then the rider will not be an optimum biomechanical position for uphill pedaling.

Figure 7:
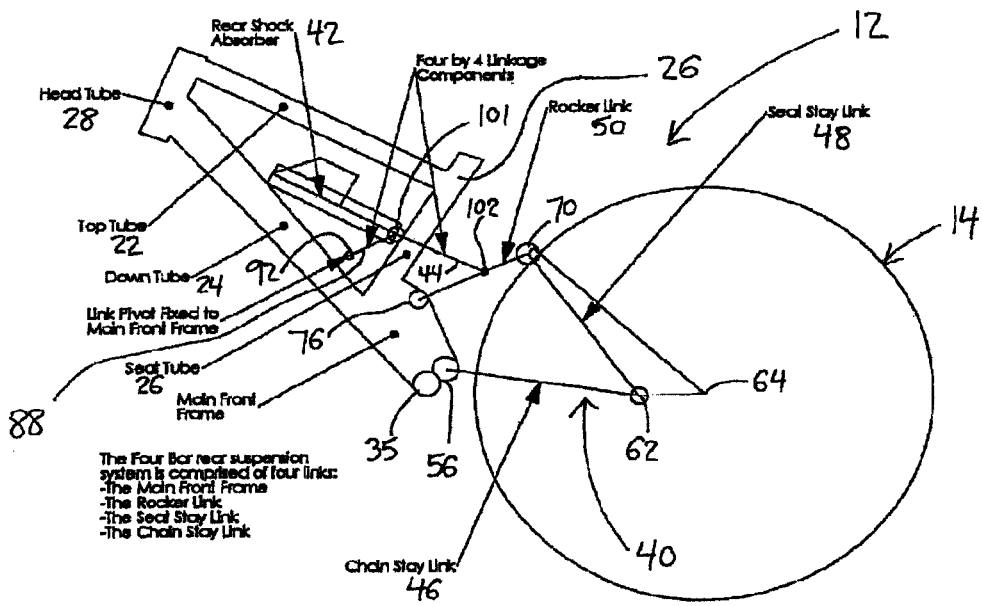
FIG. 7 is a schematic view showing the bicycle subframe and rear suspension of FIGS. 3-5 when the suspension system is in an uncompressed configuration.

As explained above, the principles of the present invention may apply to many alternative bicycle configurations, including bicycles having different frame 18 and/or rear suspension 40 configurations. Some examples of alternative arrangements are shown schematically in FIGS. 6-10. FIG. 6-7 illustrates schematically the embodiment of FIGS. 3-5 where linkage 44 is driven by rocker arm link 50 (FIG. 6 showing this configuration in a compressed configuration and FIG. 7 showing the same configuration in an uncompressed configuration).

Figure 8:
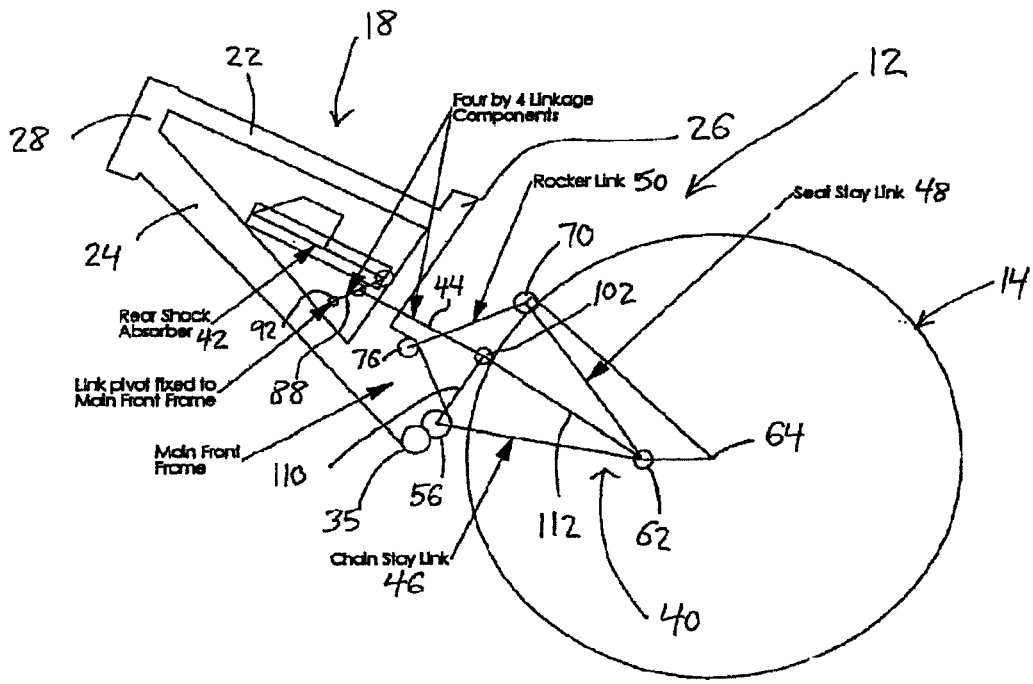
FIG. 8 is a schematic view showing the relative orientation of the bicycle subframe and rear suspension system in an alternative embodiment of the invention.

FIG. 8 illustrates an alternative arrangement where linkage 44 is driven by chain stay link 46. In particular, instead of coupling linkage 44 to rocker arm 50, pivot 102 is located rearwardly of rocker arm 50 and is coupled by means of linkages 110 and 112 to pivots 56 and 62 located on opposite ends of chain stay link.

Figure 9:
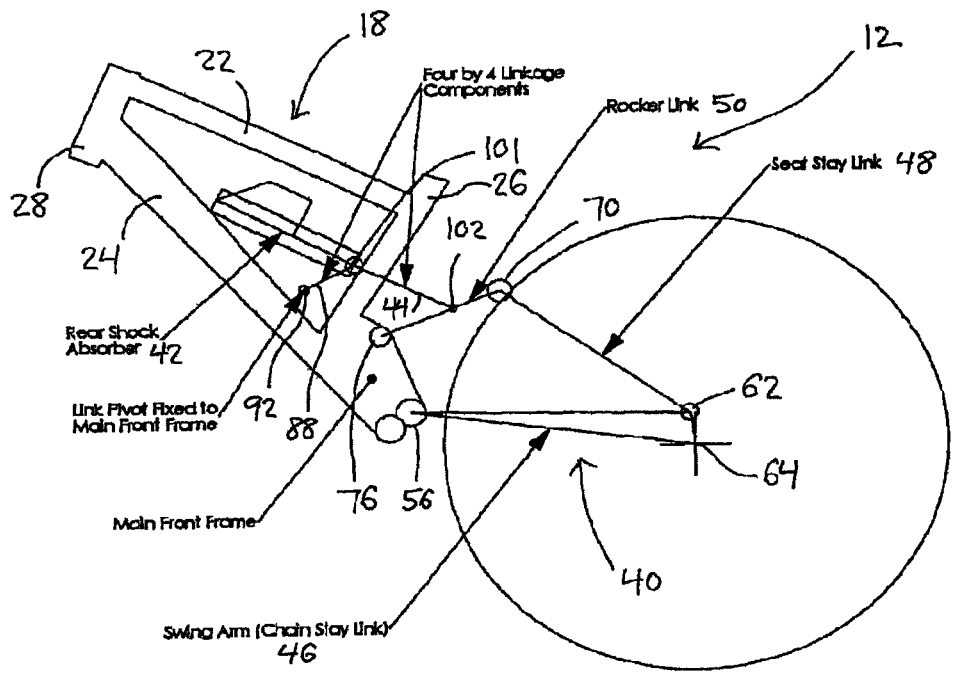
FIG. 9 is a schematic view showing the relative orientation of the bicycle subframe and rear suspension system in a further alternative embodiment of the invention.

FIG. 9 illustrates a further alternative arrangement where linkage 44 is driven by a single pivot suspension system employing a longer swing arm (i.e., chain stay link 46). In this arrangement rear wheel 14 is mounted at a fixed location on chain stay link 46 which is in turn connected directly to pivot 54. In this embodiment pivot 62 is positioned at one end of seat stay link 48 and linkage 44 is driven by a combination of rocker link 50 and seat stay link 48.

Figure 10:
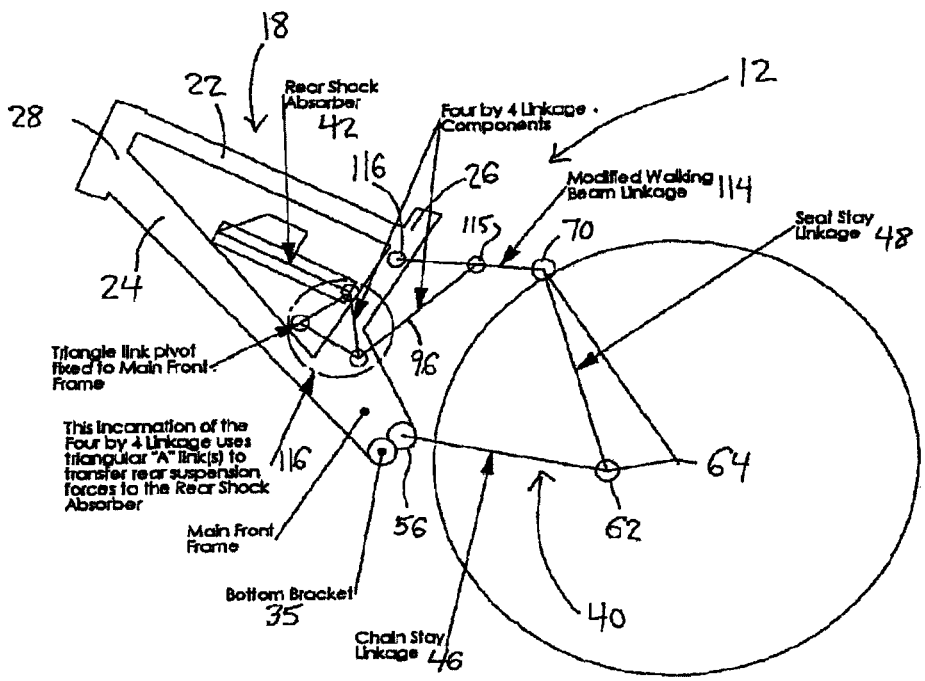
FIG. 10 is a schematic view showing the relative orientation of the bicycle subframe and rear suspension system in a further alternative embodiment of the invention.

FIG. 10 illustrates a walking beam four bar linkage utilizing the invention. In this case a modified walking beam linkage 114 extends between an upper end of seat stay link 48 and a pivot 116 mounted on seat tube 26. Linkage 44 employs a push linkage 96 having one end pivotably coupled to walking beam linkage 114 by means of a pivot 115 and another end coupled to triangular a A-links 116 fixed to frame 18. At least one segment of A-links 116 intersects a plane parallel to the longitudinal axis of seat tube 26 to couple push linkage 96 to shock absorber 42. As in other embodiments of the invention, linkage 44 functions as an intermediate coupling for transferring rear suspension forces around seat tube 26 to shock absorber 42 located at a position forwardly of seat tube 26.

As will be appreciated by a person skilled in the art, many other alternative variations of linkage 44 may be envisioned for use in association with different rear suspension designs.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:
1. A bicycle having a rear wheel, the bicycle comprising:
(a) a frame orientable in a vertical plane, the frame comprising a seat tube having a longitudinal axis;
(b) a rear suspension for pivotally coupling the rear wheel to the frame, wherein said rear suspension controls a path traversed by said rear wheel as said rear suspension moves between relatively uncompressed and compressed positions;
(c) a rear shock absorber disposed entirely forwardly of the seat tube;
(d) a linkage coupling the rear suspension to the rear shock absorber for transferring forces therebetween, wherein the linkage extends in an orientation intersecting a transverse plane passing through the seat tube parallel to the longitudinal axis, wherein said linkage is pivotably coupled to said shock absorber and comprises a first link coupled to said rear suspension and a second link coupled to said frame, wherein said first and second links are operatively coupled together and are movable relative to one another to control progression of said shock absorber as said suspension moves between said relatively uncompressed and compressed positions, wherein said linkage transmits said forces around said seat tube.

2. The bicycle of claim 1, wherein the linkage straddles the seat tube.

3. The bicycle of claim 1, wherein the linkage comprises first and second spaced apart linkage elements disposed on opposite sides of the seat tube.

4. The bicycle of claim 1, wherein the linkage has a length exceeding a diameter of the seat tube.

5. The bicycle of claim 1, wherein the rear suspension comprises one or more pivot points and wherein a most forward one of the one or more pivot points is located rearwardly of the seat tube longitudinal axis.

6. The bicycle of claim 1, wherein the linkage is pivotably coupled to the rear suspension.

7. The bicycle of claim 1, wherein the linkage is pivotably coupled to the shock absorber.

8. The bicycle of claim 1, wherein the seat tube is continuous.

9. The bicycle of claim 1, wherein the frame comprises a down tube and a bottom bracket mounted at a lower end of the down tube for receiving a crank assembly of the bicycle, and wherein the longitudinal axis of the seat tube intersects the down tube at a location forward of the bottom bracket.

10. The bicycle of claim 1, wherein the shock absorber includes first and second ends coupled to the frame forwardly of the seat tube.

11. The bicycle of claim 10, wherein the first end of the shock absorber is pivotably coupled to the frame and wherein the second end of the shock absorber is pivotably coupled to the linkage.

12. The bicycle of claim 11, wherein the shock absorber has a longitudinal axis extending in a plane at an angle of between 45-90° relative to the vertical plane.

13. The bicycle of claim 12, wherein the frame includes a top tube, a head tube and a bottom tube in addition to the seat tube and wherein the longitudinal axis of the shock absorber extends generally parallel to a longitudinal axis of the top tube.

14. The bicycle of claim 1, wherein the rear wheel is spaced apart from the seat tube when the rear suspension is in a fully compressed position.

15. The bicycle of claim 1, wherein the longitudinal axis of the seat tube extends at an angle substantially tangential to the most forward position of the rear wheel.

16. The bicycle of claim 1, wherein the longitudinal axis of the seat tube extends at an angle between about 50-75° relative to a horizontal plane passing through the seat tube and extending perpendicular to the vertical plane.

17. The bicycle of claim 1, wherein the rear suspension has a four bar suspension design comprising a chain stay link and a seat stay link coupled to the wheel and a rocker arm link coupled to the seat stay link and extending forwardly therefrom.

18. The bicycle of claim 17, wherein the linkage is coupled to the rocker arm link.

19. The bicycle of claim 17, wherein the linkage is coupled to the seat stay link 20. The bicycle of claim 17, wherein the linkage is coupled to the chain stay link.

21. The bicycle of claim 10, wherein the frame comprises a top tube, a head tube and a down tube in addition to the seat tube, wherein the first and second ends of the shock absorber are coupled to the down tube.

22. The bicycle of claim 1, wherein a vertical travel range of the suspension system exceeds about 5 inches.

23. The bicycle of claim 1, wherein a vertical travel range of the suspension system exceeds about 7 inches.

24. A bicycle having a rear wheel, the bicycle comprising:
(a) a frame orientable in a vertical plane, the frame comprising a seat tube having a longitudinal axis;
(b) a rear suspension pivotally coupling said wheel to said frame, wherein said rear suspension controls a path traversed by said rear wheel as said rear suspension moves between relatively uncompressed and compressed positions;
(c) a rear shock absorber disposed entirely forwardly of said seat tube; and
(d) a linkage coupling said rear suspension to said shock absorber for transferring forces therebetween, wherein said linkage extends in an orientation intersecting a transverse plane passing through said seat tube parallel to said longitudinal axis, wherein said linkage is pivotably coupled to said shock absorber and comprises a first link coupled to said rear suspension and a second link coupled to said frame, wherein said first and second links are operatively coupled together and are movable relative to one another to control progression of said shock absorber as said suspension moves between said relatively uncompressed and compressed positions, wherein said linkage is pivotably coupled to said rear suspension.

25. A bicycle having a rear wheel, the bicycle comprising:
(a) a frame orientable in a vertical plane, the frame comprising a seat tube having a longitudinal axis;
(b) a rear suspension pivotally coupling said wheel to said frame, wherein said rear suspension controls a path traversed by said rear wheel as said rear suspension moves between relatively uncompressed and compressed positions;
(c) a rear shock absorber disposed entirely forwardly of said seat tube; and
(d) a linkage coupling said rear suspension to said shock absorber for transferring forces therebetween, wherein said linkage extends in an orientation intersecting a transverse plane passing through said seat tube parallel to said longitudinal axis, wherein said linkage is pivotably coupled to said shock absorber and comprises a first link coupled to said rear suspension and a second link coupled to said frame, wherein said first and second links are operatively coupled together and are movable relative to one another to control progression of said shock absorber as said suspension moves between said relatively uncompressed and compressed positions, wherein said second link constrains the motion of said first link as said suspension moves between said relatively uncompressed and compressed positions.

26. A bicycle having a rear wheel, the bicycle comprising:
(a) a frame orientable in a vertical plane, the frame comprising a seat tube having a longitudinal axis;
(b) a rear suspension pivotally coupling said wheel to said frame, wherein said rear suspension controls a path traversed by said rear wheel as said rear suspension moves between relatively uncompressed and compressed positions;
(c) a rear shock absorber disposed entirely forwardly of said seat tube; and
(d) a linkage coupling said rear suspension to said shock absorber for transferring forces therebetween, wherein said linkage extends in an orientation intersecting a transverse plane passing through said seat tube parallel to said longitudinal axis, wherein said linkage is pivotably coupled to said shock absorber and comprises a first link coupled to said rear suspension and a second link coupled to said frame, wherein said first and second links are operatively coupled together and are movable relative to one another to control progression of said shock absorber as said suspension moves between said relatively uncompressed and compressed positions, wherein said second link supports reciprocating movement of said first link between relatively rearward and forward positions as said suspension moves between said relatively uncompressed and compressed positions.

\* \* \* \* \*